No. 611,217. Patented Sept. 20, 1898.
H. JACKSON.
LAWN MOWER.
(Application filed May 13, 1896.)
(No Model.) 2 Sheets—Sheet 1.
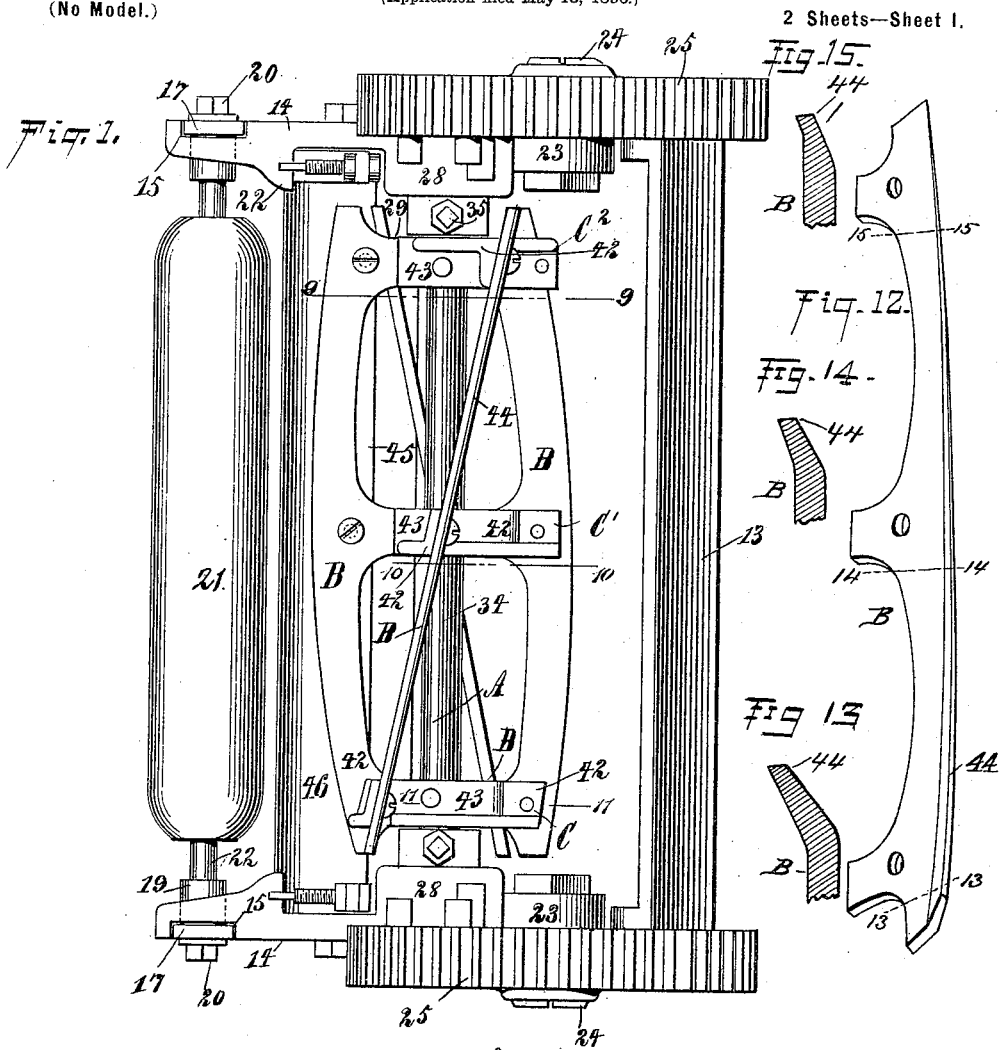
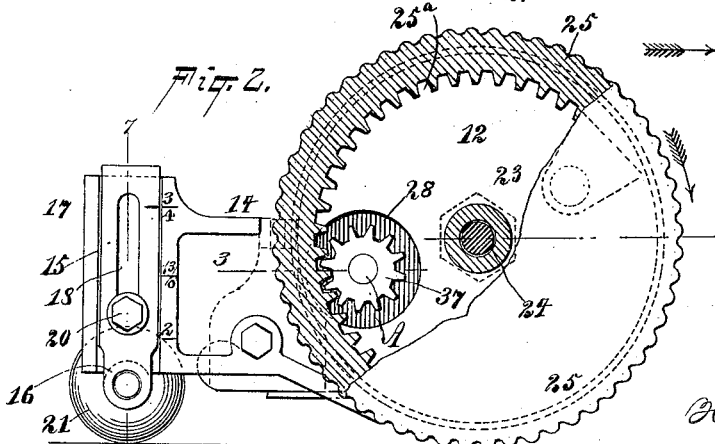
INVENTOR
H. Jackson
BY
ATTORNEYS.
WITNESSES:

No. 611,217. Patented Sept. 20, 1898.
H. JACKSON.
LAWN MOWER.
(Application filed May 13, 1896.)
(No Model.) 2 Sheets—Sheet 2.
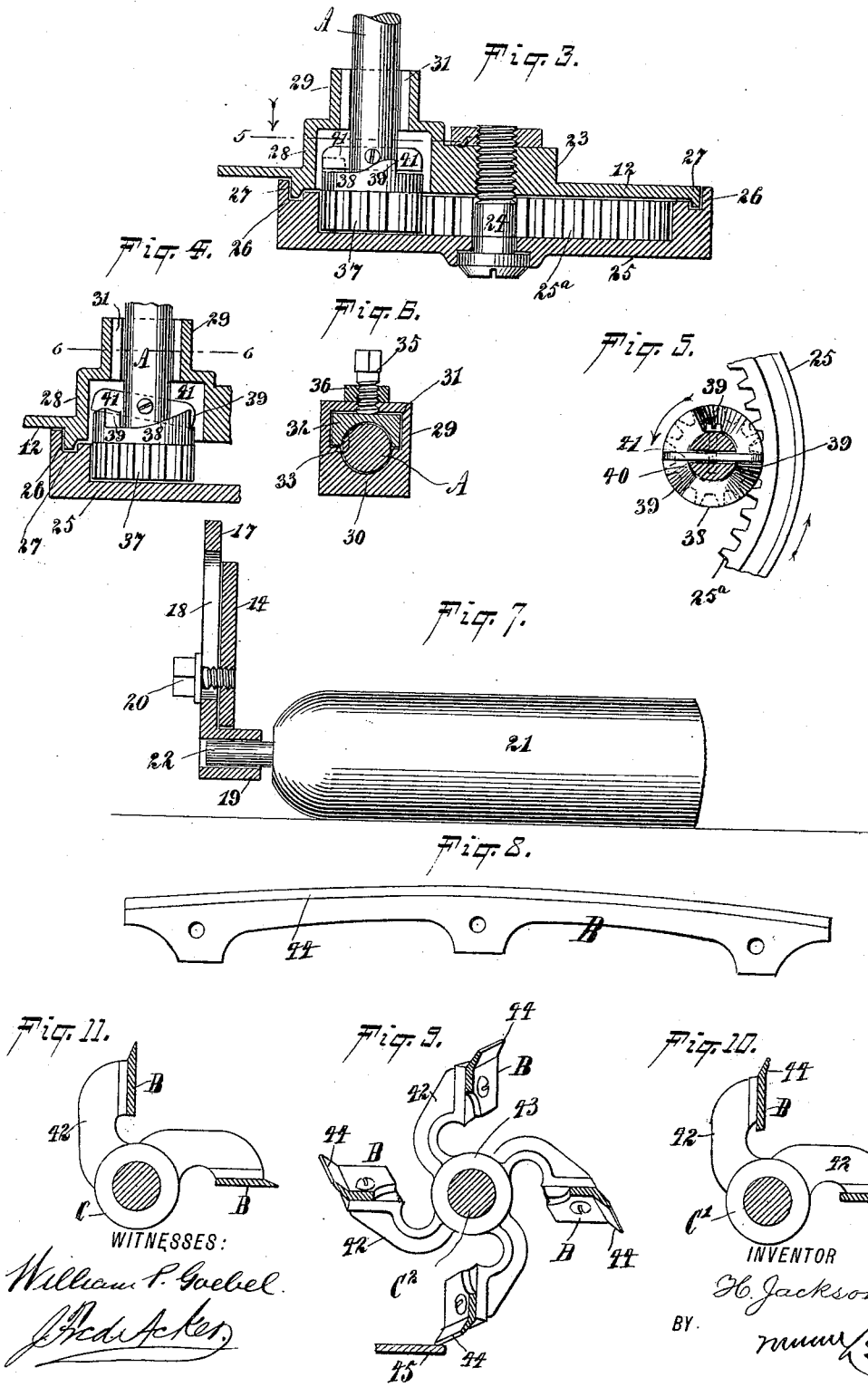

UNITED STATES PATENT OFFICE.

HARRY JACKSON, OF KINGSTON, NEW YORK.

LAWN-MOWER.

SPECIFICATION forming part of Letters Patent No. 611,217, dated September 20, 1898.

Application filed May 13, 1896. Serial No. 591,369. (No model.)

*To all whom it may concern:*

Be it known that I, HARRY JACKSON, of Kingston, in the county of Ulster and State of New York, have invented a new and Improved Lawn-Mower, of which the following is a full, clear, and exact description.

The invention relates to an improvement in lawn-mowers; and the object of the invention is to construct a mower in which the knives will be so shaped as to obtain the best possible cutting action and so that during the cutting operation the knives will free themselves from the cut grass, the grass being likewise practically freed from the entire machine, thus preventing clogging.

A further object of the invention is to provide a simple and effective means for adjusting the knives to obtain a long or a short cut, the adjustment being accomplished in an exceedingly expeditious manner.

Another object of the invention is to provide a rear supporting-roller which will have lateral movement, enabling the machine to readily turn corners.

It is also an object of the invention to construct the driving connection between the knife-shaft and the supporting-wheels of the machine, so that it will be simple, durable, and economic, and will operate the shaft only when the machine is being pushed ahead.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved lawn-mower. Fig. 2 is an end view of the same, parts being broken away. Fig. 3 is a horizontal section taken substantially on the line 3 3 of Fig. 2. Fig. 4 is a section taken on the same line as Fig. 3, illustrating, however, the clutch connection between the driving-wheels and the knife-shaft in the position it would occupy when the machine is being drawn backward, the knife-shaft at that time remaining still. Fig. 5 is a vertical section taken substantially on the line 5 5 of Fig. 3, illustrating the aforesaid clutch connection in end view. Fig. 6 is a vertical section on the line 6 6 of Fig. 4, illustrating one of the bearings for the knife-shaft. Fig. 7 is a partial side elevation of the rear roller and a sectional view on the line 7 7 in Fig. 2 through a portion of the frame and the adjustable bracket carrying the said roller. Fig. 8 is a side elevation of one of the knives detached from the machine. Fig. 9 is a section through the knife-shaft and its knives, the said section being taken on the line 9 9 of Fig. 1. Fig. 10 is a similar section taken on the line 10 10 of Fig. 1. Fig. 11 is a like section taken substantially on the line 11 11 of Fig. 1. Fig. 12 is a perspective view of one of the mower-blades. Figs. 13, 14, and 15 are cross-sections of a blade, taken on the lines 13 13, 14 14, and 15 15, respectively, illustrating the spiral arrangement of the flange of the cutting-blade with reference to the body portion of the blade.

In carrying out the invention the frame is made of two disk side pieces 12, connected at the front near the top preferably by a cross-bar 13, and from the rear lower portion of each side disk a cheek-piece 14 is rearwardly projected, and in the outer face of each cheek-piece a vertical groove 15 is made, the lower end of the said cheek-piece 14 having an upwardly-concaved indentation 16 at the curve 15. A hanger 17 is held to slide in the groove of each cheek-piece, and each hanger is provided with a longitudinal slot 18, and a sleeve 19 is formed at the lower end of each hanger, which sleeves are seated in the respective indentations 16, when the sleeves are raised to the limit of their upward movement. The sleeves extend inwardly beneath the recessed portions 16 of the cheek-piece. When the said sleeves of the hangers are seated in the indentations 16 of the cheek-pieces, as shown in Fig. 2, the frame will be in such position that the knives carried thereby will cut the grass close to the ground, leaving said grass, for example, but three-quarters of an inch high, and to facilitate the adjustment of the knives to cut the grass at given lengths a scale is produced upon the cheek-pieces, as shown in Fig. 2, and a mark is made upon the hangers, which when brought in registry with any number or fraction on the scale will indicate an adjustment of the knives to cut the grass the length designated by the said number or fraction. The hangers are held in their adjusted position by passing set-screws 20 through the slots of the hangers and into suitable openings in the cheek-pieces. A guide-roller 21, which is likewise an adjusting-roller, has its trunnions 22 journaled loosely in the sleeves 19 of the hangers, as shown in Figs. 1 and 7. The said roller 21 forms the purchase through the medium of which the knives are brought to and from the ground, and owing to the roller being loose in its bearings and having end movement therein the roller will accommodate itself to curves—as, for example, in turning corners—and enable the machine to be readily handled.

At the central portion of the inner face of each side disk 12 a boss 23 is produced, as shown particularly in Fig. 3, and the pivot-pins 24 for the supporting-wheels 25 are passed through openings in the said wheels, being screwed or otherwise secured in the aforesaid bosses 23, and each pivot-pin may be provided with a lock-nut at its inner end. The inner face of each supporting-wheel is provided with a circular chamber and an internal gear 25$^a$, made by producing teeth in the side wall of the aforesaid chamber. Each wheel, upon its inner face, near its periphery, is provided with an annular groove 26, and in these grooves flanges 27, formed on the side disks of the frame, are made to enter, the said flanges being annular, and in this manner dust and grass are prevented from entering the chamber of the wheels.

At the rear of the boss 23 on the side piece of the frame a pocket 28 is formed, the said pocket being provided with an interior circular chamber in direct communication with the chamber in the wall adjacent to which it may be located, and each pocket 28 at its inner end is provided with an extension 29, which is preferably polygonal in cross-section, and these extensions are adapted as bearings for the ends of the knife-shaft A. The bearings 29, as shown in Fig. 6, are provided with a semicircular recess 30 at a point below the center, and a chamber 31, preferably rectangular, above the aforesaid recess. A block 32 is located in the chamber 31 of each bearing 29, each block having a semicircular recess 33 in its under face, coinciding with the lower recesses 30 in the said bearings, as is also shown in Fig. 6. The knife-shaft is made to enter these recesses 30 and 33, and any lost motion owing to wear is taken up by a set-screw 35, which is preferably placed in the top of the bearings and has engagement with the upper portion of the block 32, each set-screw being ordinarily provided with a lock-nut 36. The knife-shaft is driven from the supporting or traction wheels 25, and the shaft is turned only when the machine is advanced, and when the machine is drawn backward the shaft remains still. This action is accomplished, preferably, as shown in Figs. 3, 4, and 5—namely, a pinion 37 is mounted loosely upon each end of the knife-shaft A, and the teeth of the pinion mesh with the internal gear of the driving-wheels. Each pinion is provided with a clutch-surface 38 upon its inner face, and the aforesaid clutch-surface has, ordinarily, three ratchet-teeth 39, made therein equidistant apart. These teeth are square upon one side, and at the opposite side each tooth is beveled or curved, forming an inclined plane which extends along the inner face of the tooth to the straight side of the same, as shown in Figs. 3 and 4.

Back of each pinion 37 a slot 40 is made in the knife-shaft, as shown in Fig. 5, and in each slot a bar 41 is centrally pivoted, the bar extending equidistant beyond opposite sides of the shaft. These bars have a rocking movement to and from the clutch-faces of the pinions, as shown in Fig. 4, and preferably the edge of the bar facing the aforesaid clutch-surfaces 38 of the pinions is beveled in opposite directions at opposite sides of the center. When the machine is pushed forward, the straight faces of the clutch-teeth 39 engage with the rocking bar 41, carrying the shaft around, but when the machine is drawn backward the beveled or inclined surfaces of the aforesaid clutch-teeth alternately engage with the ends of the rocking bar and force the said bar to the position shown in Fig. 4, admitting of the pinions 37 turning freely without the clutch acting on the shaft.

The knives B are each formed of a flat plate of steel, the cutting edge of which is curved outwardly, as shown in Fig. 8, and in such an arc as will cause the cutting edge to move truly against the ledger-blade of the mower. This curving of the cutting edge is common to lawn-mowers of the class to which my invention belongs. Each knife has its cutting edge formed on a flange 44, which is struck from the outer edge of the knife, being at an angle thereto. The right-hand extremity of each knife is straight and without the flange, as shown in Fig. 11, but from this extremity the flange gradually increases in the angle with reference to the main portion of the knife until at the left-hand end of the knife the angle is greatest. The flange extends beyond one side only of the knife, as shown in Figs. 9 and 12. Fig. 10, being a section taken approximately through the middle of the knives, shows the flange at an intermediate inclination. The flanges 44 serve to strengthen the plates of which the knives are formed and to prevent vibration of these plates during the operation of the machine. By making the plates straight, contradistinguished from the usual spiral form, the knife is made much cheaper and is more easily adjusted than heretofore. When the knife is straight, it is necessary that the flange 44 be provided and given the peculiar form described, so that the cutting edge will always be accurately engaged with the ledger-knife. The knives B are respectively held to the shaft A by means of collars 43, fixed on the shaft and provided with arms 42, projecting radially and carrying the knives. As shown in Fig. 1, the arms 42 of each knife are arranged in a line diagonal with reference to the shaft A, so that the knives will be held in a similar position. It will also be seen that the faces of the arms 42, which faces engage the knives, are in the same diagonal plane in which the corresponding knife extends.

Having thus described my invention, I claim as new and desire to secure by Letters Patent—

1. In a lawn-mower, a frame, a support at the rear of the frame, and a roller journaled in said support, said roller in addition to its rotary movement being movable endwise sufficient to bring a preponderance of its contact-surface to one side of the longitudinal center of the mower, whereby the roller will be effective in assisting the turning movement of the mower, as specified.

2. A lawn-mower having a frame, a driven shaft mounted in the frame, a blade formed of a plain metallic plate means carried by the shaft and holding the plate diagonally with reference to the shaft, the blade having a tapering flange at its outer edge, the said flange being at an angle to the blade, projecting beyond one side and running gradually from zero at one extremity of the blade to the greatest width of the flange at the opposite extremity of the blade, and a ledger-knife held in position to be engaged by the edge of the flange on the knife, substantially as described.

3. A lawn-mower having a frame, a ledger-blade held rigidly thereon, a rotary shaft mounted in the frame, and a knife carried by the shaft and arranged to move diagonally against the ledger-blade, the knife having its outer edge provided with a tapering flange inclined to the main portion of the blade, extending beyond one side and reaching gradually from zero at one extremity of the blade to the greatest width of the flange at the opposite extremity of the blade, the outer edge of the flange being beveled to form the cutting edge of the blade.

4. A lawn-mower blade formed of a plate the cutting edge of which is provided with a tapering flange disposed at an angle to the body portion of the blade, extending beyond one side thereof and running gradually from zero at one end to its greatest width at the opposite end of the blade.

HARRY JACKSON.

Witnesses:
DANIEL B. STOW,
WILBUR L. HALE.